Patented Sept. 27, 1932

1,879,155

UNITED STATES PATENT OFFICE

HARRY C. FISHER, OF NORWOOD, OHIO, ASSIGNOR TO THE RICHARDSON COMPANY, OF LOCKLAND, OHIO, A CORPORATION OF OHIO

COLORING SLABS OF MINERAL SUBSTANCES

No Drawing. Application filed January 17, 1929. Serial No. 333,245.

The preferred embodiment of my invention which I shall describe, has to do with the coloring of the so-called asbestos shingles, which are sold in great quantities. Heretofore in coloring rigid shingles, of this type, comprising in their composition cement and asbestos fiber, it has been necessary to incorporate a color in the batch of material being mixed, with the result that the entire substance of the shingle has been colored. This represents, particularly in the case of the more expensive pigments, of which green is an example, considerable waste, inasmuch as the surface only of the shingle is visible and requires color. Shingles of this character are not subject to heavy abrasion such as appreciably wears the body of them, so that there is no compensating advantage for the body coloring. There has hitherto been no way of surface coloring shingles of this character so as to produce on the one hand a satisfactory article, and so as on the other hand to avoid detrimental effects upon the product brought about by the coloring process.

It is an object of my invention to provide a process for the coloring of rigid shingles of this type, and allied substances.

It is another object of my invention to provide as a new article of manufacture a surface-colored asbestos cement slab.

It is still another object of my invention to do away with certain disadvantages at present inherent in asbestos shingles, among which is "blooming".

Ancillary objects of my invention involve the provision of an insoluble and weather resisting surface coating of color; the effecting of a considerable saving over processes involving the body coloring of such slabs; the protection of the article itself during coloring, from disintegration, warping or cracking due to the heat treatment, and from the dehydrating or calcining of its constituents; the provision of a wide range of possible colors; the provision of variations of texture in the colored surface from a dull matte or lusterless surface to a surface approximating a glaze, so that the products are susceptible to use as tiles and the like for interior decoration; and finally the provision of a color coating which is firmly bonded to the body of the article and is not liable to be cracked, chipped or dislodged therefrom.

Broadly, my process involves the application to the surface of shingles or like objects, of a solution of silicate of soda or other soluble silicate which is itself colored or which contains coloring matter in the nature of a pigment, and the dehydration of this coating in place.

As an example of this process, green shingles can be produced by preparing 25 pounds of a solution comprising 4¾ pounds of chemically pure chromic oxide, 15.8 pounds of sodium silicate and 4.45 pounds of water. This amount of suspension is sufficient to cover 1000 square feet of surface.

The shingles to be colored are coated with the solution, as by brushing, spraying, imprinting or the like, and when this has been done, I prefer to air-dry them for about an hour, or at least until a skin of hardened silicate has formed over them. I then subject the shingles to a temperature ranging from 900° to 1000° F. more or less, and I prefer to do this by placing them upon a conveyor running through a horizontal kiln in such a manner that the coated surfaces face the most intense heat.

The heat may be obtained in any desired manner, as for example, by the combustion of fuel oil or gas, and if the flame is so controlled as not to deposit soot or foreign matter upon the coated surfaces, there is apparently no necessity for shielding the surfaces from the direct action of the flame. It is to be borne in mind, however, that the temperature limits which I have set forth as being preferable should not be substantially exceeded.

I have found that a surface temperature in the articles within the limits set forth will be readily obtained in from 15 to 30 minutes of normal heating, and it is not necessary to maintain this temperature for longer than 10 to 15 minutes, after which I prefer to continue passing the articles through a portion of the kiln in which the temperature gradually fades off from the maximum, since I have found that cracking is prevented by a gradual lowering of the temperature. The time necessary for the heat treatment will vary somewhat, depending upon the size and thickness of the shingles and their moisture content. The essential figure is the one stating the time of highest roasting temperature for the silicate of soda.

Similarly, 1000 square feet of surface can be coated blue by using 26.6 pounds of a mixture containing 4.8 pounds of ultramarine blue pigment and 16.2 pounds of silicate of soda, the remainder being added water.

When my procedure is carried out as I have outlined, it is characteristic that the zone of highest temperature is at the surface and that the heat treatment is continued for so brief a period that the entire body of the shingle need not be raised as high as the surface. This largely prevents any disadvantageous action of the heat upon the shingles. Materials of this character are subject to disintegration under heat, both through the dehydration of the asbestos and the calcining of the cement substances. Not only is it not necessary in my process to heat the body of the shingles to detrimental temperatures, even while treating the surface thereof at between 900° and 1000° F., but I am in some instances able to use much higher temperatures briefly for other purposes without destroying the product.

Thus when temperatures of 1400° to 1500° F. are used with the green formula given above, the heat being so applied that it affects the treated surface only, the green coating can be fused down to a green glaze. In a similar manner, other formulæ containing other pigments may be turned into glazes; although obviously where the pigment itself is affected by the heat or where the pigment dissolves in the glaze with the production of a characteristic color, a color in the glaze will result differing from that which is attained in the matte coating. Thus, ultramarine blue will produce a bluish-black color by this treatment, while a formula containing red oxide of iron will produce a brown color. In this fashion, as I have hitherto pointed out, articles can be produced with glazed surfaces suitable for use as interior tile or the like, and giving upon the roof a highly attractive appearance.

Again the color of the resultant glaze may be affected by pigment substances which are absorbed during refusion out of the body of the shingle itself and due allowance for this must be made. It permits however, another useful variant of my process in that a pigmenting substance may be diliberately added to the body of the shingle durng the formation thereof to the end that a portion may be absorbed by the glaze during refusion. When this is done, the remaining color in the shingle body, if any, will reinforce the color of the glaze and a very rich result may thus be produced.

I may further reduce the temperature requirements of my process by the use of a particular sodium silicate solution having an analysis as follows:

| | |
|---|---|
| Baumé at 68° F | 40.3 degrees |
| Solids | 32.23% |
| Moisture | 67.77% |
| $Na_2O$ | 6.67% |
| $SiO_2$ | 25.88% |
| Factor $\frac{Na_2O}{SiO_2}$ | 1:3.88 |

It is characteristic of sodium silicate solutions of a factor around 1:3.25 that a rather severe heat treatment is necessary to produce weather resistance. The heat treatment must be such as completely to dehydrate the silicate of soda solution and perhaps in some instances to cause it to intumesce or whiten. When completely dehydrated, silicate solutions of this factor are so substantially insoluble in water as to be to all intents and purposes weather resistant. As the factor drops below 1:3.25, the weather resistance after calcining decreases until at certain ratios none remains. A silicate such as I prefer, however, having a factor of 1:3.88 is practically insoluble in water when once dried. Hence a lower heat treatment is required when using it than when using other silicates higher in sodium content; and it is not necessary to bring about an intumescence in all cases to make certain that dehydration has proceeded to the desired extent. It is to be noted, however, that I need not use a silicate so rich in silica. Excellent results are obtained with silicates of a factor 1:3.25, as an example.

Asbestos shingles of the class described are subject to what is known as "blooming", which is the formation upon their surfaces of whitish deposits which are usually insoluble. This "blooming" is believed to be due to the leaching out of certain soluble substances from the cement, and the reaction of these substances with the carbon dioxide present in the atmosphere. This reaction produces a white scum believed to consist mainly of insoluble carbonates. Sometimes a substantially insoluble calcium sulphate leaches out and forms a "bloom" upon the surface, without reacting with carbon dioxide in the air.

Asbestos shingles colored by my process do not "bloom". Whether this is due merely to the fact that whatever "blooming" occurs is covered up by the silicate coating, or whether the leaching of substances from the body of the shingle is entirely prevented because the cement and asbestos composition is protected by the silicate coating from the effects of moisture and from the action of carbon dioxide, I do not know. I do know that the formation of insoluble "blooms" is prevented by my process.

The silicate coating which I place on asbestos shingles is itself, however, subject to a "blooming" in the nature of the leaching out of whitish substances; but inasmuch as these substances are soluble sodium compounds, they wash off with the first rain and the shingle thereafter retains its color, clear, bright and unimpaired by "blooms".

I have thus provided as a new article of commerce a rigid asbestos shingle with a weather resistant surface coating of color, and I have avoided by my process detrimental action upon the shingle during the coloring step. There is commercially no tendency for my shingles to warp or crack while being colored, for the reasons that the heat to which they are subjected is initially low and is so applied and of such short duration that the body of the shingle is not detrimentally affected. I have reason to believe that whatever slight loss of strength may actually occur in the shingle in the coloring step is regained when the shingles are exposed to the weather and absorb their normal quantity of moisture.

Having thus described my invention, what I claim as new and desire to secure by Letters Patent, is:—

1. A rigid article of asbestos cement composition surface-coated with dehydrated silicate in which a pigment has been suspended, said silicate having a ratio of sodium or potassium oxide to $SiO_2$ not less than 1:3.25.

2. That process of coloring mineral slabs which comprises surface-coating said slabs with silicate of soda having a ratio of $Na_2O$ to $SiO_2$ not less than 1:3.25, and moving said slabs through a zone of gradually rising temperature into a zone where the surfaces of said slabs will reach a temperature of between 900° and 1000° F. and moving said slabs out of said zone into a zone of gradually falling temperature.

3. That process of coloring asbestos cement articles which comprises coating the surfaces thereof with colored silicate and heat treating the said surfaces at between 900° and 1000° F. without heating the body of said slabs to that temperature.

4. That process of coloring asbestos cement shingles which comprises coating the surfaces thereof with colored silicate of soda having a ratio of $Na_2O$ to $SiO_2$ not less than 1:3.25 and heat treating said surfaces to dehydrate the same, without heating the body of said slabs to a point where dehydration and/or calcining can take place.

5. That process of coloring asbestos cement shingles which comprises coating the said shingles with colored silicate, air-drying said shingles, gradually heating said shingles to a temperature between 900° and 1000° F. and slowly cooling said shingles.

6. That process of coloring asbestos cement shingles which comprises coating the said shingles with colored silicate, air-drying said shingles, gradually heating said shingles to a temperature between 900° and 1000° F. maintaining said temperature for from 10 to 15 minutes, whereby said silicate coating becomes dehydrated, and slowly cooling said shingles.

7. That process of coloring asbestos cement shingles which comprises coating the said shingles with colored silicate, air-drying said shingles, gradually heating said shingles to a temperature between 900° and 1000° F. then subjecting said shingles to a temperature of between 1400° and 1500° F. whereby said silicate becomes re-fused into a glaze and fuses more or less onto the surface of the shingle, then slowly cooling said shingles.

8. That process of coloring asbestos cement shingles which comprises surface coating said shingles with colored silicate of soda, air-drying said coating, placing said shingles upon a conveyor and moving them through a kiln, whereby the surface temperature thereof is gradually raised to between 900° and 1000° F. and then is slowly cooled from said temperature.

9. That process of forming a glaze on asbestos-cement articles comprising coating an article with sodium silicate having a ratio of $Na_2O$ to $SiO_2$ not less than 1:3.25, which may be pigmented, drying the coating, then raising the temperature by application of heat to the refusion point of the silicate.

HARRY C. FISHER.